United States Patent
Niu

[11] Patent Number: 5,176,418
[45] Date of Patent: Jan. 5, 1993

[54] NON-STICKING KITCHEN SPATULA

[76] Inventor: Chi-Chou Niu, No. 15, Alley 30, Lane 43, Tzyh-Chiang St., Taichung, Taiwan

[21] Appl. No.: 814,648
[22] Filed: Dec. 30, 1991
[51] Int. Cl.⁵ ............................................. A47J 43/28
[52] U.S. Cl. .................................................... 294/7
[58] Field of Search ............................... 294/7, 8, 56; 15/236.01, 236.05, 236.06, 236.07; 30/169, 172, 326, 327, 328

[56] References Cited

U.S. PATENT DOCUMENTS

| D. 172,537 | 7/1954 | Hill | 15/236.01 X |
| 366,099 | 7/1887 | Hinchman | 294/56 |
| 1,181,135 | 5/1916 | Harrison | 294/56 |
| 1,553,151 | 9/1925 | Edwards | 30/169 |
| 2,417,585 | 3/1947 | Cahill | 15/236.01 |
| 3,092,411 | 6/1963 | Hardy | 294/7 |
| 3,224,091 | 12/1965 | Scigliano | 30/169 X |
| 3,730,579 | 5/1973 | Mock | 294/8 |
| 5,104,166 | 4/1992 | Corsaro et al. | 294/8 |

FOREIGN PATENT DOCUMENTS 481624 3/1938 United Kingdom .................. 294/56

Primary Examiner—Johnny D. Cherry
Assistant Examiner—Dean J. Kramer
Attorney, Agent, or Firm—Browdy and Neimark

[57] ABSTRACT

A non-sticking kitchen spatula comprises a protective jacket made from heat-resistant and non-toxic material and detachably and securely attached to the front edge of the spatula body by means of hooks and insertion portion of the protective jacket and the grooves of the spatula body. Such kitchen spatula does not scrape the non-sticking coating of pots and pans, and can be also used to spread and turn over food in the ordinary non-Teflon pots and pans.

4 Claims, 2 Drawing Sheets

NON-STICKING KITCHEN SPATULA

BACKGROUND OF THE INVENTION

The present invention relates to a cookware or a kitchen appliance, and more particularly to a non-sticking kitchen spatula.

There are the so-called non-sticking pots and pans to which food does not stick. Such pots and pans are provided with a non-sticking coating of a tough insoluble polymer called polytetrafluorethylene (PTFE) or Teflon so as to prevent food from sticking to the surface of pots and pans, which can be cleaned and washed easily. However, the conventional spatula used to spread and turn over the food is generally of stainless steel material and can therefore scrape the Teflon coating of pots and pans. The scraped Teflon coating can be eventually peeled off from the surface of pots and pans to undermine the non-sticking effect of the Teflon coating. Such incident may be one of the contributing factors for consumers to become increasingly resistant to using such non-sticking pots and pans. As a result, business of manufacturers of such non-sticking pots and pans can be seriously hampered.

SUMMARY OF THE INVENTION

It is therefore an object of the present invention to provide a kitchen spatula with a protective jacket, which serves to protect the non-sticking coating of pots and pans and can be detached from the spatula so as to permit the spatula to be used in ordinary pots and pans without non-sticking coating.

According to the present invention, a spatula includes a stainless steel body provided with a plurality of grooves having two or three expansion holes intended to hold thereto a protective jacket of heat-resistant material. The protective jacket comprises several hooks on an insertion portion located at front edge thereof so as to permit the protective jacket to be detachably attached to the stainless steel body of the spatula in order to prevent the spatula from scraping the non-sticking coating of pots and pans.

The present invention may best be understood through the following description with reference to the accompanying drawings, in which:

DETAILED DESCRIPTION OF THE PREFERRED EMBODIMENT

Figure 1:
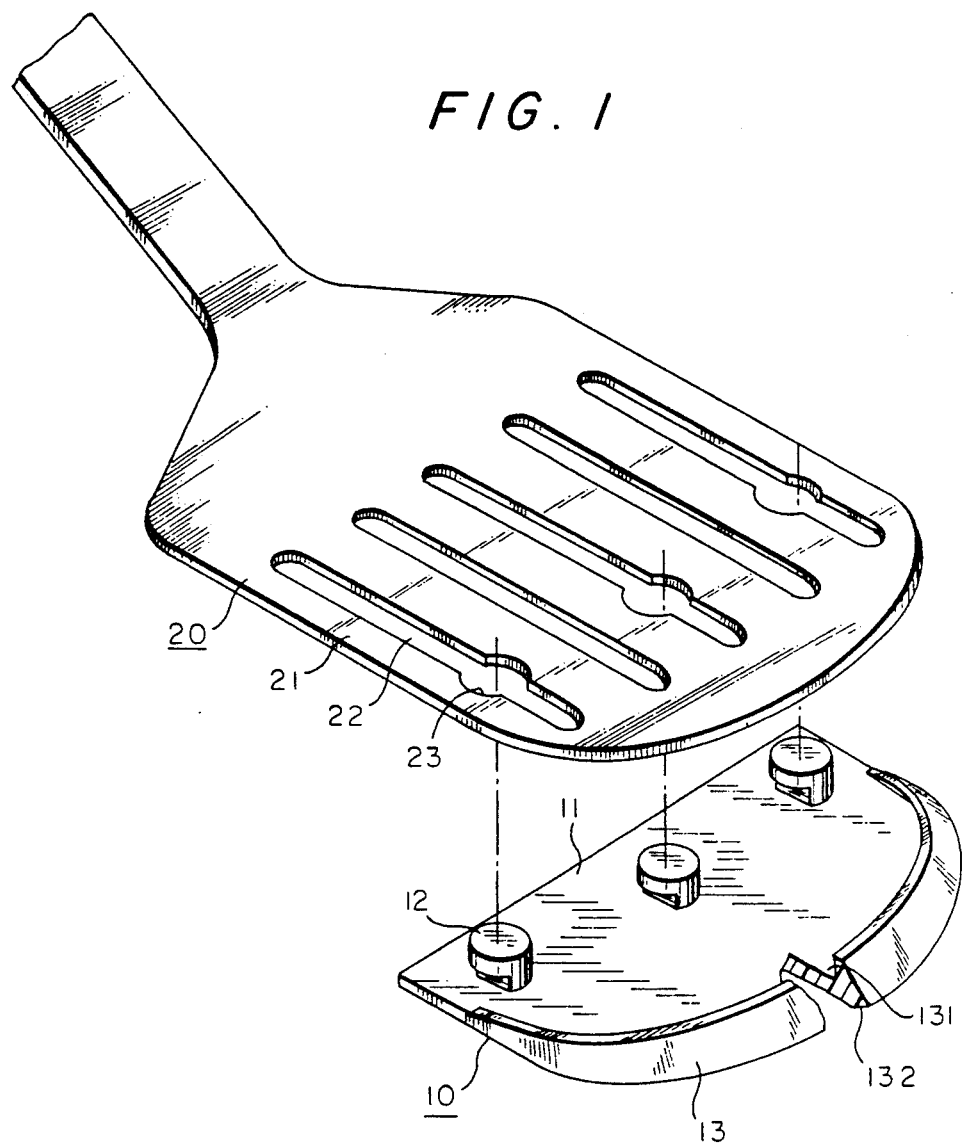
FIG. 1 is an exploded view showing a first preferred embodiment of a spatula according to the present invention.
Figure 2:
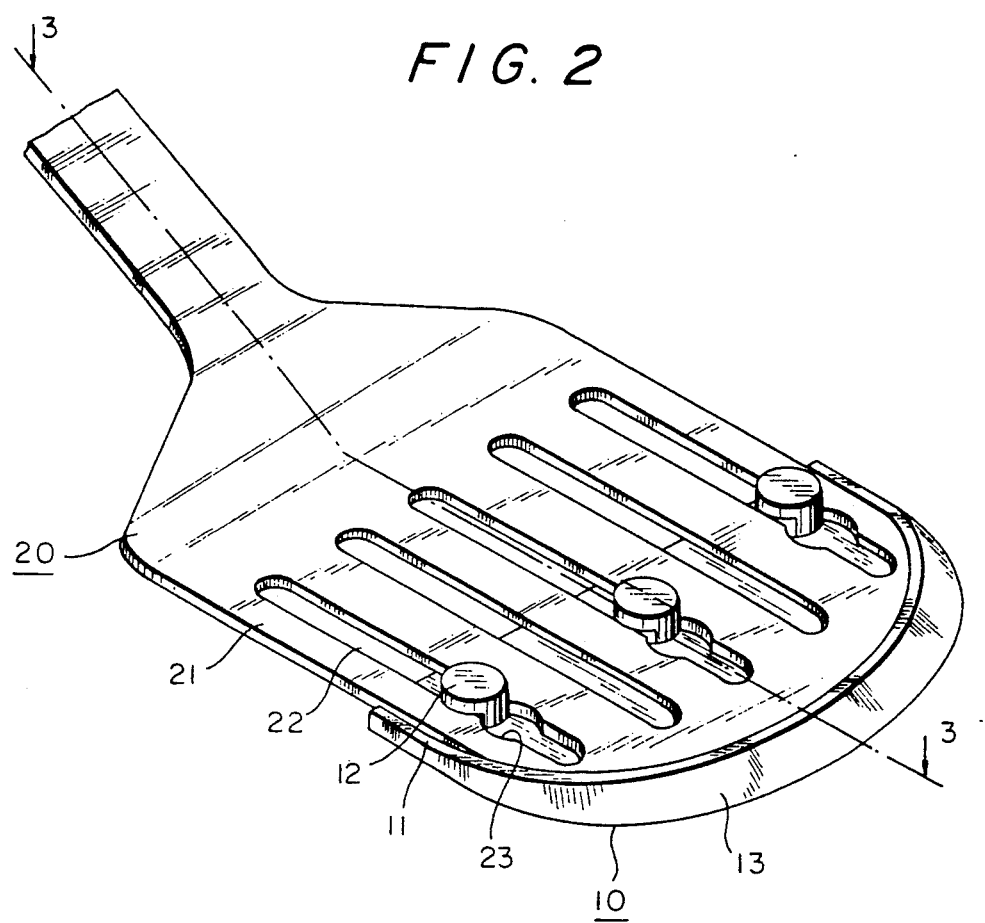
FIG. 2 is a perspective view of a spatula in FIG. 1.
Figure 3:
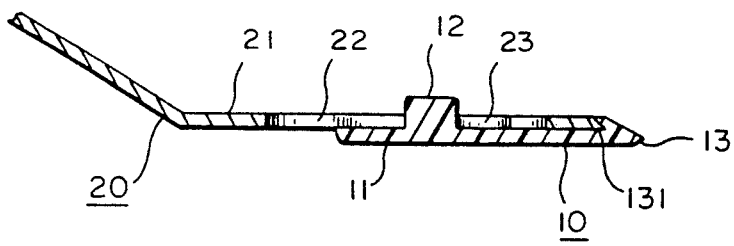
FIG. 3 is a sectional view taken along line 3—3 in FIG. 2.

Referring now to FIGS. 1-3, a first preferred embodiment of the present spatula includes a protective jacket 10 and a spatula body 20.

The protective jacket 10 is composed of a plate 11 which is made from the heat-resistant and non-toxic material and is provided on the upside thereof with three inverted round protruded hooks 12. In addition, the plate 11 is provided at the front portion thereof with an insertion edge 13 of bowlike curved shape. An insertion portion 131 is formed between the inner side of the insertion edge 13 and the plate 11. The insertion edge 13 consists of a bevel 132 disposed in the periphery thereof, with both sides thereof being gradually inclined toward the plate 11.

The spatula body 20 is composed of a spatula plate 21 with a handle. The spatula plate 21 has five parallel grooves 22 disposed thereon, among which three grooves 22 are each provided with an expansion hole 23 positioned correspondingly to each of the three hooks 12 of the protective jacket 10. The distance between the expansion hole 23 and the front edge of the spatula plate 21 is shorter than that between the hook 12 and the insertion portion 131 of the protective cover 10.

The three hooks 12 of the protective jacket 10 can be put through the corresponding expansion holes 23. Thereafter, the protective jacket 10 is pushed in a direction toward the spatula handle so that the hooks 12 are slid into the grooves 22, in conjunction with the front edge of the spatula body 20 being slid into the insertion portion 131 of the protective jacket 10.

The three hooks 12 of the protective jacket 10 engage securely the grooves 22 of the spatula body 20. In addition, the front edge of the spatula body 20 is retained by the insertion portion 131 of the protective jacket 10. Therefore, the protective jacket 10 will not detach accidentally from the spatula body 20.

The features of the present invention are further expounded hereinafter.

The protective jacket 10 is made from heat-resistant material and does not scrape the non-sticking coating of pots and pans. Therefore, the kitchen spatula embodied in the present invention serves to prolong the service life of non-sticking pots and pans and to make the washing of such pots and pans easy.

The structures of non-sticking kitchen spatula of the present invention are simple and ingeniously designed that the protective jacket 10 is detachably attached to the spatula body 20 in order to permit the spatula to be used in situations where either the Teflon non-sticking pots and pans or the ordinary non-Teflon pots and pans are needed.

Figure 4:
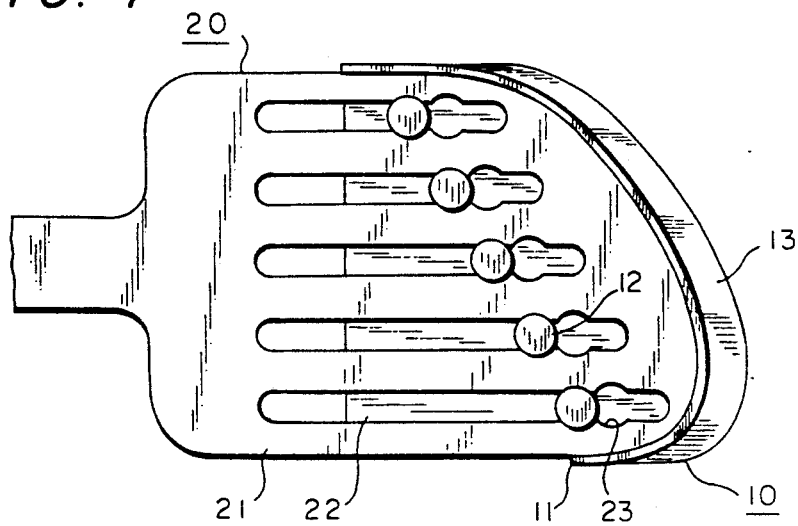
FIG. 4 is a top view showing a second preferred embodiment of a spatula according to the present invention.

A second preferred embodiment of the present spatula, as shown in FIG. 4. The shape of the spatula body 20 and protective jacket 10 are both differing from the embodiment shown in FIGS. 1-3.

While the invention has been described in connection with what is presently considered to be the most practical and preferred embodiments, it is to be understood that the invention is not to be limited to the disclosed embodiments but on the contrary, is intended to cover various modititications and equivalent arrangements included within the spirit and scope of the appended claims which scope is to be accorded the broadest interpretation so as to encompass all such modifications and equivalent structures.

What is claimed is:

1. A non-sticking kitchen spatula comprising:
   a spatula body having a spatula plate engaged to a handle;
   said spatula plate having a front edge and a plurality of parallel slots;
   each of at least two of said plurality of parallel slots having an expansion hole;
   a protective jacket made from a heat resistant material which moves over non-sticking pots and pans without scraping their surface;

said protective jacket having a beveled front edge sloping over an upper side of said protective jacket to provide an insertion portion behind said beveled front edge;

at least two hook means integrally engaged to said upper side of said protective jacket for holding said spatula plate in engagement to said protective jacket;

wherein the distance between each said expansion hole of said spatula plate and said front edge of said spatula plate is shorter than that between said at least two hook means of said protective jacket and said insertion portion of said protective jacket;

wherein, said protective jacket is engaged to said spatula body by inserting each said at least two hook means respectively through each said hole and sliding said front edge of said spatula plate into engagement with said insertion portion of said protective jacket while said each said hook means slides in each corresponding slot of said at least two of said plurality of parallel slots and engages said spatula plate.

2. A non-sticking kitchen spatula according to claim 1, wherein said expansion hole has a width greater than a width of each of said at least two of said plurality of parallel slots.

3. A non-sticking kitchen spatula according to claim 2, wherein each of said at least two hook means has an upper portion having an area substantially equal to said hole and a lower portion having a width substantially equal to said width of each of said at least two of said plurality of parallel slots.

4. The non-sticking kitchen spatula according to claim 2, wherein said beveled front edge and said continuous front edge of said spatula plate each has a curved shape that substantially corresponds when said spatula plate is engaged in said insertion portion.

* * * * *